(No Model.)
E. H. DUHME.
SUGAR GAGE FOR VACUUM PANS.
No. 484,145. Patented Oct. 11, 1892.
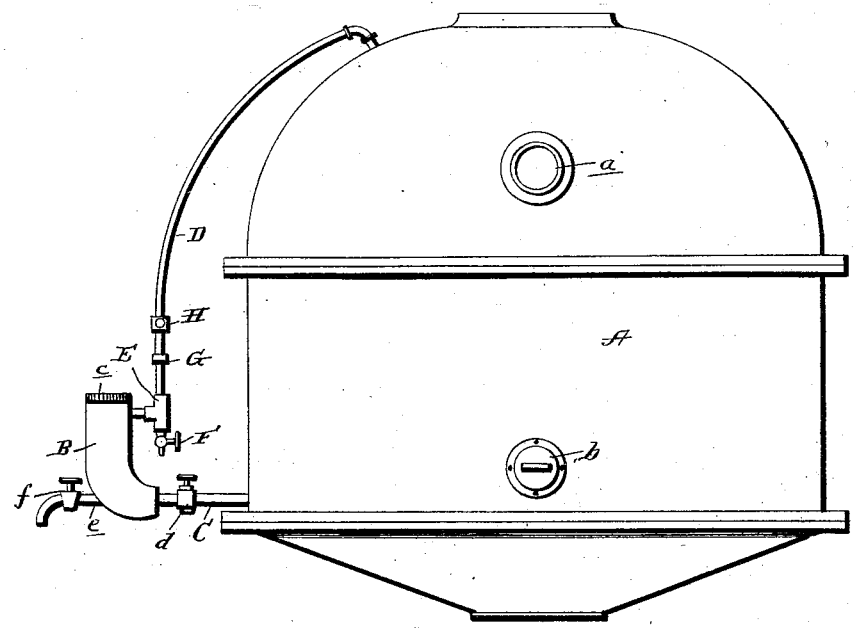

UNITED STATES PATENT OFFICE.

EDWARD H. DUHME, OF NEW ORLEANS, LOUISIANA.

SUGAR-GAGE FOR VACUUM-PANS.

SPECIFICATION forming part of Letters Patent No. 484,145, dated October 11, 1892.

Application filed May 11, 1891. Renewed July 23, 1892. Serial No. 441,067. (No model.)

*To all whom it may concern:*

Be it known that I, EDWARD HENRY DUHME, a citizen of the United States, residing at New Orleans, in the parish of Orleans and State of Louisiana, have invented certain new and useful Improvements in Sugar-Boiling Gages; and I do declare the following to be a full, clear, and exact description of the invention, such as will enable others skilled in the art to which it appertains to make and use the same.

This invention relates to improvements in devices for accurately gaging the density of boiling sugar or saccharine solutions; and the novelty will be fully understood from the following description and claim, when taken in connection with the annexed drawing, in which the figure is a side view of the vacuum-pan, showing my improvements applied.

Referring by letter to said drawing, A indicates a vacuum-pan having the usual sight-aperture $a$ and a hole $b$ for the proof-stick.

B indicates a gage-cylinder. This cylinder, which is arranged in a vertical position at the base of the vacuum-pan, is provided with a closed top $c$, which top or cap may be composed of rubber or other suitable material. The gage-cylinder is connected at its lower end with the interior of the vacuum-pan by means of a horizontal pipe C, through which the saccharine solution is designed to flow from the vacuum-pan into the cylinder B, and this pipe C is provided with a straight-way cock $d$, by which the flow may be governed or shut off. The cylinder B is also provided at its base with a discharge-pipe $e$, carrying a waste-cock $f$.

D indicates an air-pipe. This air-pipe leads from the upper portion of the vacuum-pan, or that portion known as the "vapor-space," and is connected at its lower end with one branch of a T-coupling E, which is in turn connected with the upper portion of the cylinder B. This T-coupling E has on one of its branches a cock F for the admission of air to the gage-cylinder, as will be presently described.

G indicates a coupling for connecting the pipe D with the T-coupling, and H represents a valve in the pipe D above said coupling.

In operation, when it is desired to gage the density of the boiling-sugar solution in the vacuum-pan the gage-cylinder should be covered and the cock H opened, when the air in the gage-cylinder is allowed to discharge into the vapor-space of the vacuum-pan. I then open the valve or cock $d$ in the pipe C, so as to admit the boiling-sugar solution into the gage-cylinder B, and when the cylinder has filled I shut off the flow by closing the cock $d$, so as to hold the sugar solution thus drawn in the gage-cylinder. I then close the cock H and open the air-cock F, so as to break the vacuum in the gage, after which the cap or top of the gage may be removed and the density of the sugar solution ascertained by means of a hydrometer or saccharometer.

To obtain the best results, the hydrometer should be heated in warm water, so as to prevent the solution from adhering to the walls thereof, for should it be placed in cold water previous to use the gums and other impurities would adhere to the glass.

I am aware that it is not new in devices for gaging the density of sugar solutions to provide a gage-cylinder in connection with a vacuum-pan and connect said cylinder with the vacuum-space thereof. I therefore do not claim such devices, broadly; but, Having described my invention, what I claim is—

The combination, with a vacuum-pan A, of the gage-cylinder B, arranged vertically at the base of the vacuum-pan and having the top $c$, the pipe C, carrying the cock $d$ and connecting the gage-cylinder with the bottom of the pan, the discharge-pipe $e$, provided with a waste-cock and secured to the bottom of the cylinder, the air-pipe D, leading from the vapor-space of the vacuum-pan and its opposite end connected by one branch of a T-coupling with the upper portion of the gage-cylinder, the cock F on the lower branch of the T-coupling, and the valve H in the air-pipe between the vacuum-pan and the cylinder, all adapted to operate substantially as and for the purpose specified.

In testimony whereof I affix my signature in presence of two witnesses.

EDWARD H. DUHME.

Witnesses:
 ALBERT DIETTEL, Jr.,
 PERCY D. PARKS.